United States Patent [19]
Tsukamoto et al.

[11] Patent Number: 6,022,642
[45] Date of Patent: Feb. 8, 2000

[54] LITHIUM ION BATTERY CONTAINING AN ELECTRICALLY INSULATIVE FILM

[75] Inventors: Hisashi Tsukamoto; Shigeo Komatsu, both of Kyoto, Japan

[73] Assignee: Japan Storage Battery Co., Ltd., Kyoto, Japan

[21] Appl. No.: 08/998,428

[22] Filed: Dec. 24, 1997

[30] Foreign Application Priority Data

Dec. 26, 1996 [JP] Japan .................................. 8-359288

[51] Int. Cl.$^7$ ........................................... H01M 6/18
[52] U.S. Cl. .................. 429/312; 429/314; 429/317; 429/309; 429/322; 429/234; 429/251
[58] Field of Search ............................. 429/304, 312, 429/314, 317, 251, 234, 309, 322

[56] References Cited

U.S. PATENT DOCUMENTS

| | | | |
|---|---|---|---|
| 5,001,023 | 3/1991 | Cheshire et al. | 429/94 |
| 5,162,178 | 11/1992 | Ohsawa et al. | 429/218 |
| 5,554,460 | 9/1996 | Wu et al. | 429/210 |
| 5,558,957 | 9/1996 | Datta et al. | 429/127 |

FOREIGN PATENT DOCUMENTS

| | | |
|---|---|---|
| 0298800 | 1/1989 | European Pat. Off. . |
| 0497633 | 8/1992 | European Pat. Off. . |
| WO9531836 | 11/1995 | WIPO . |
| WO9710620 | 3/1997 | WIPO . |

*Primary Examiner*—Maria Nuzzolillo
*Assistant Examiner*—Laura Weiner
*Attorney, Agent, or Firm*—Sughrue, Mion, Zinn, Macpeak & Seas, PLLC

[57] ABSTRACT

A lithium ion battery includes a thin film of an electrical insulating material such as resin, a positive collector made of an electrically conductive thin film provided on one side of said electrically insulative thin film, a positive compound layer provided on said positive collector, a negative collector made of an electrically conductive thin film provided on the other side of said electrically insulative thin film, a negative compound layer provided on said negative collector, and an electrolyte film provided in contact with at least one of said positive compound layer and said negative compound layer.

12 Claims, 1 Drawing Sheet

LITHIUM ION BATTERY CONTAINING AN ELECTRICALLY INSULATIVE FILM

BACKGROUND OF THE INVENTION

1. Field of the Invention

The present invention relates to a lithium ion battery.

2. Description of the Related Art

In recent years, electronic apparatus such as portable telephone, portable personal computer and portable video camera have been developed. Various electronic apparatus have been miniaturized so that they are portable. With this trend, batteries having a raised energy density and a reduced weight have been employed. A typical battery satisfying the foregoing requirements is a secondary lithium battery comprising an active material such as lithium metal and lithium alloy, an intercalation lithium-based compound having lithium ion occluded in a host material (material capable of occluding and releasing lithium ion) as a negative material, and an aprotic organic solvent having a lithium salt such as $LiClO_4$ and $LiPF_6$ dissolved therein as an electrolyte.

A secondary lithium battery comprises a negative plate having the foregoing negative material retained on a negative collector as a support, a positive plate having an positive active material which undergoes reversible electrochemical reaction with lithium ion, such as lithium-nickel composite oxide, retained on a positive collector as a support, and a separator which retains an electrolyte and is provided interposed between the negative plate and the positive plate to prevent shortcircuiting between the two electrodes.

In the case of strip-shaped or cylindrical battery, the foregoing positive plate, the separator and the negative plate are used in a thin sheet or foil form. These elements are laminated sequentially, optionally wound spirally, and then inserted into a battery container.

A foil made of a metal such as copper and aluminum has been used as the electrode's current collector.

Apparatus employing as a power supply a battery, not limited to lithium battery, are strictly required to reduce the entire weight thereof and further safety. Further, batteries which exhibit higher properties than ever and have a reduced weight and a raised safety are favored by users.

SUMMARY OF THE INVENTION

It is an object of the present invention to provide a lithium ion battery having a high energy density, an extremely light weight and an excellent safety.

A lithium ion battery according to the present invention is comprised of an electrically insulative thin film; a positive collector comprising an electrically conductive thin film, which is provided on one side of the electrically insulative thin film; a positive compound layer provided on the positive collector; a negative collector comprising an electrically conductive thin film provided on the other side of the electrically insulative thin film; a negative compound layer provided on the negative collector; and an electrolyte film provided in contact with at least one of the positive compound layer and the negative compound layer.

In the present invention, preferably, the thickness of the positive collector is from 4 to 20 μm, that of the positive compound layer is 30 to 160 μm, that of the negative collector is from 1 to 20 μm, the negative compound layer is from 30 to 160 μm, and that of the electrolyte film is from 5 to 40 μm.

The present invention can provide a lithium battery having an excellent energy density, an extremely light weight and an excellent safety. In addition, the use of the lithium battery according to the present invention makes it possible to reduce the weight of portable electronic apparatus. Therefore, the present invention is of great industrial and commercial value.

DETAILED DESCRIPTION OF THE INVENTION

Figure 1:
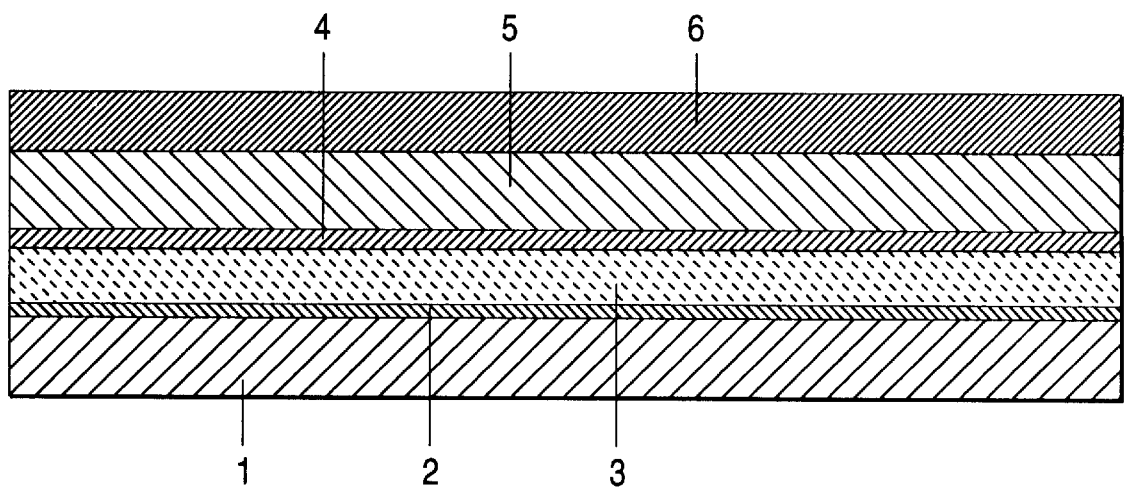
FIG. 1 is a sectional view illustrating an electrode to be applied to an example of the battery according to the present invention.

Detailed description of the present invention will be described as follows referring to the accompanying drawings.

A battery according to the present invention is mainly composed of the following elements.

An electrically insulative thin film such as resin. A positive collector made of an electrically conductive thin film provided on one side of the electrically insulative thin film. A positive compound layer provided on the positive collector. A negative collector made of an electrically conductive thin film provided on the other side of the electrically insulative thin film. A negative compound layer provided on the negative collector. An electrolyte film provided in contact with at least one of said positive compound layer and said negative compound layer.

In the battery according to the present invention, the electrode has an electrically insulative thin film as to be given enough mechanical strength for battery fabrication. Therefore, the collector itself can be thin. Further, since the electrically insulative thin film is not made of a metal, the entire weight of the electrode comprising a thin collector film provided on both sides thereof is lighter than that of a collector made of a metal foil having the same thickness as the electrode. Further, both sides of a substantially single electrically insulative thin film is used to support the positive electrode on one side thereof and the negative electrode on the other. In this arrangement, the positions of the positive electrode and the negative electrode do not shift from each other. In this respect, the battery according to the present invention differs from the conventional batteries, which each is mainly composed of a positive electrode, a negative electrode and a separator in separate forms, making it likely that when laminated or wound, the positions of the two opposing electrodes may shift from each other to reduce the reaction area or the separator can move to cause shortcircuiting.

As the electrically insulative thin film there may be used any substantially single electrically insulative layer. Therefore, a single sheet may be normally used. Alternatively, two sheets may be laminated in close contact to form an integrated body. If a single sheet is used, the step of integration can be omitted. On the other hand, if two sheets are laminated in close contact, a positive collector and a positive electrode compound may be fixed to only one side of one of the two sheets while a negative collector and a negative electrode compound may be fixed to only one side of the other. At a subsequent step, the two sheets of electrically insulative thin films may be laminated in close contact to form an integrated body. Therefore, the unevenness of the thickness of the compound layer on one of the two sheets of electrically insulative thin films does not affect the accuracy of the thickness of the compound layer on the other during the coating of the compound layer or in other occasions.

The electrically insulative thin film is preferably mainly composed of a thermoplastic resin such as polyethylene (PE), polyethylene terephthalate (PET) and polypropylene (PP). This is because most thermoplastic resins exhibit a thermal deformation temperature lower than the thermal run away temperature of lithium secondary battery and its film undergoes heat shrinkage or melts and rapidly break current passage then it prevent to start thermal run away reaction in the battery when it goes short circuit. Therefore, a particularly preferred electrically insulative thin film has a thermal deformation temperature lower than 200° C. which is the devastating thermal mechanical reaction in the battery.

As the electrically conductive thin film constituting the collector, there may be one obtained by plating, vacuum metallizing, sputtering or the like. A rolled foil may be used.

The electrolyte film should satisfy the requirement that it is chemically or electrochemically stable in the battery. In addition to this requirement, the electrolyte film should have a mechanical strength high enough to keep the two electrodes apart from each other at a safe distance in a battery assembly step involving winding or laminating of the electrodes, hot press on, or during the use of the battery thus assembled. To this end, it is necessary that the electrolyte be so flexible as to give a good contact with the electrode, so incompressible as to prevent compression beyond a predetermined point and so rigid as to withstand pin penetration or pulling.

Accordingly, the electrolyte film is preferably made of a solid electrolyte. This is because the solid electrolyte cannot leak and has a sufficient mechanical strength unlike liquid electrolytes. However, the electrolyte film does not need to be made of a single component as a whole nor needs to be made of an electrolyte as a whole. For example, an electrolyte film having an enhanced electrical conductivity obtained by impregnating a solid electrolyte with a liquid electrolyte or an electrolyte film obtained by impregnating a known separator with a liquid electrolyte may be used. This is because the liquid electrolyte facilitates the transfer of lithium ion at the electrolyte film-electrode interface or in the electrolyte film. However, if the electrolyte film contains an organic electrolyte, the charging voltage cannot be raised beyond the breakdown voltage of the organic electrolyte, restricting the range of the active material which can be selected. Accordingly, an electrolyte film free from organic electrolyte is desirable to enhance the degree of freedom of selection of the material.

As the solid electrolyte, there may be used any of an organic material, an inorganic material and a mixture thereof. A solid electrolyte made of an organic solid material such as polyethylene oxide, polyacrylonitrile, polyethylene glycol and modification product thereof has a lighter weight and a higher flexibility than an inorganic solid material and thus is insusceptible to cracking during winding. On the other hand, a solid electrolyte made of a lithium ionically-conductive inorganic solid material such as lithium-niobate perovskite has a sufficient heat resistance and thus exhibits an excellent reliability at high temperatures. An electrolyte film made of a mixture of an organic solid material and an inorganic solid material can exhibit both the advantages of the two components which mutually compensate the disadvantages of the other component. In other words, even if the organic material in the mixture is eluted, it can be retained by the inorganic material and thus cannot be lost. Even if the inorganic material is used in a large amount, the organic material acts as a binder to thereby prevent the electrolyte film from cracking. If one of the two components of the mixture constituting the electrolyte film is an electrolyte, the other may be a non-electrolyte such as magnesium oxide and silicon oxide.

The positive compound layer or negative compound layer may contains an electrolyte incorporated therein to enhance the efficiency of reaction with the electrolyte in the electrolyte film. As the electrolyte employable herein, there is preferably used a solid electrolyte for the same reason as in the foregoing electrolyte film, that is, if an organic electrolyte is used, the selection range of active material is limited. The amount of an organic electrolyte, if any, should be very small.

The thin film material constituting the positive collector may be also made of aluminum. Aluminum exhibits an excellent corrosion resistance and thus cannot be eluted with the electrolyte even upon charging, during which the positive electrode is in a high potential. Referring to the form of the thin film, it is available in the form of foil, if it is aluminum. The electrically insulative thin film and the metallic thin film constituting the positive collector may be in the form of aluminum-evaporated resin film.

On the other hand, a particularly preferred example of the thin film constituting the negative collector is a vacuum-evaporated or rolled thin film of copper (Cu), copper-nickel alloy or nickel (Ni) or combination thereof. Copper is advantageous in that it has a high electrical conductivity and is inexpensive. However, it has been experimentally known that copper dissolves in a potential region electromagnetically higher than 3.1 V vs. Li/Li$^+$. Accordingly, it is appropriate that copper is used in a potential range of from 0 V to 3 V. On the contrary, nickel does not dissolve up to a range of 4.0 to 4.2 V vs. Li/Li$^+$. Thus, nickel is advantageous in that it has a wide potential window. Copper-nickel alloy has both the advantages of the two components, i.e., high electrical conductivity given by copper and high corrosion resistance given by nickel.

The electrolyte film preferably is constituted by a mixture of a polyacrylonitrile which exhibits a binding function as well as lithium ionic conduction and an incompressible powdered lithium-lanthanum titanium perovskite oxide having a sufficient mechanical strength and an excellent lithium ion conduction, the mixture being impregnated with an organic electrolyte containing a lithium salt. The incorporation of the organic electrolyte makes it possible to enhance the contact and electrical conductivity of the electrolyte film.

EXAMPLES

Example

An example of the lithium battery according to the present invention was prepared by the following manner.

A battery power-generating element formed by spirally winding a tape-like electrode was impregnated with an electrolyte, and then the battery power-generating element is heat sealed in an aluminum-laminated bag. The electrode used had an arrangement such that a positive compound layer 1, a collector film 2, an insulating film 3, a collector film 4, a negative compound layer 5 and an electrolyte film 6 are laminated sequentially as shown in section in FIG. 1.

The positive compound layer 1 was formed by mixing 6 parts by weight of a polyvinylidene fluoride as a binder, 3 parts by weight of acetylene black as an electrically-conducting agent, 81 parts by weight of $LiCo_{0.15}Ni_{0.82}Al_{0.03}O_2$ as an active material and N-methylpyrrolidone as a solvent to prepare an active material paste, applying the active material paste to the collector film 2 so that a dry weight was 2.44 g/100 cm², drying the coated material, and then press-molding the coated material to have a thickness of 70 μm. The collector film 2 was formed by adhering an aluminum foil having a thickness of 2 μm to the insulating film 3 to form a laminate. As the insulating film 3, there was used a polyethylene terephthalate film having a thickness of 10 μm.

The negative compound layer 5 was formed by adding N-methylpyrrolidone to a mixture of 92 parts by weight of graphite and 8 parts by weight of a polyvinylidene fluoride to prepare a paste, applying the paste to the collector film 4 in such an amount that the coated weight was 1.20 g/100 cm², drying the coated material, and then press-molding the coated material to a thickness of 80 μm. The collector film 4 made of a copper film having a thickness of 3 μm. It was formed by vacuum-evaporating nickel onto the support, and then electrolytically plating the nickel film with copper to a thickness of 3 μm.

Subsequently, the electrolyte film 6 was applied to the negative compound layer 5, and then dried. The electrolyte film was formed by mixing 90 parts by weight of a powdered lithium-lanthanum perovskite ($Li_{0.35}La_{0.55}TiO_3$) having an average particle diameter of 0.5 μm and a specific surface area of 5 m²/g and 10 parts by weight of a polyacrylonitrile, adding N-methylpyrrolidone to the mixture to prepare a paste, applying the paste to the negative compound layer in an amount such that the coated weight was 0.5 g/100 cm², drying the coated material, and then press-molding the coated material to a thickness of 15 μm.

Figure 2:
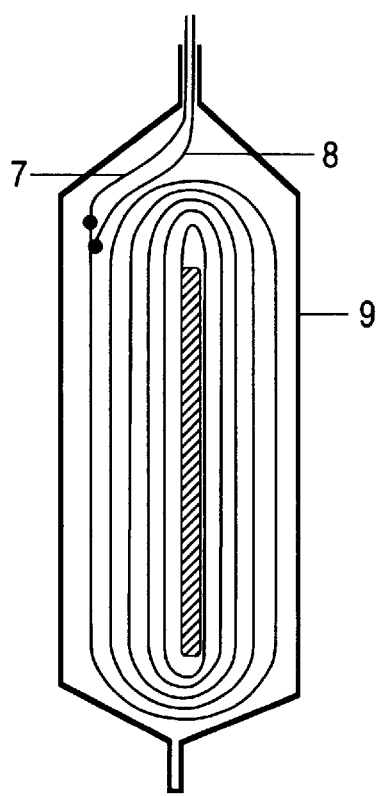
FIG. 2 is a sectional view illustrating the example of the battery according to the present invention.

These electrodes were then wound. The end of the collector films 2 and 4 were then pulled out as a positive electrode terminal 7 and a negative electrode terminal 8, respectively. The wound body was then received into an aluminum-laminated case 9 as shown in FIG. 2. The compound layers were then impregnated with a 1M $LiPF_6$/EC+DEC electrolyte in vacuo. The battery thus assembled was charged by 20% of the theoretical capacity to release the initially-evolved gas. The aluminum-laminated case 9 was sealed to complete a 600 mAh battery. If the aluminum-laminated case is sealed before the initial charging, the gas produced during the initial charging resides in the battery case to cause a rise in the inner pressure of the battery, thereby deforming the battery. This problem becomes remarkable because a resin or a laminate of a metallic thin film and a resin used as a battery case has a very low pressure resistance as compared with the conventional metal battery case.

The battery thus obtained had a capacity of 600 mAh, a weight as light as 15 g on the average (n=5) and an energy density as high as 144 Wh/kg on the average (n=5). 300 pieces of batteries having the same structure as above were produced and observed under X-ray microscopy. As a result, no malwound batteries were found.

Comparative Example

A battery having the same structure as used in the foregoing example was produced except that a positive plate having the same positive compound layer as used in the foregoing example provided on both sides of an aluminum foil having a thickness of 20 μm and a negative plate having the same negative compound layer as used in the foregoing example provided on both sides of an aluminum foil having a thickness of 18 μm were wound with a porous film separator made of a polyethylene having a thickness of 25 μm provided interposed therebetween to prepare a battery power-generating element.

The battery thus obtained had a capacity of 600 mAh, a weight of 23 g on the average (n=5) and an energy density of 94 Wh/kg on the average (n=5), which is very lower than that of the battery according to the example according to the present invention. 300 pieces of batteries having the same structure as above were produced and observed under X-ray microscopy. As a result, 1% (3 pieces) of the batteries were found to have malwound electrodes. It is apparent that such malwinding is a main cause of ununiformity in charge-discharge leading to deterioration of properties as well as of safety.

In the present invention, preferable thicknesses of respective elements are as follows.

What is claimed is:

1. A lithium ion battery, comprising:
   an electrically insulative film;
   a positive collector comprising an electrically conductive film, which is provided on one side of said electrically insulative film;
   a positive compound layer provided on said positive collector;
   a negative collector comprising an electrically conductive film provided on the other side of said electrically insulative film;
   a negative compound layer provided on said negative collector; and
   an electrolyte film provided in contact with at least one of said positive compound layer and said negative compound layer.

2. A battery according to claim 1, wherein said electrically insulative film comprises a resin.

3. A battery according to claim 2, wherein said resin is a thermoplastic resin.

4. A battery according to claim 3, wherein said thermoplastic resin is at least one of polyethylene (PE), polyethylene terephthalate (PET) or polypropylene (PP).

5. A battery according to claim 1, wherein said electrolyte film comprises a solid electrolyte.

6. A battery according to claim 5, wherein said solid electrolyte is an organic solid material.

7. A battery according to claim 6, wherein said organic solid material is at least one of polyethylene oxide, polyacrylonitrile, polyethylene glycol or a compound made therefrom.

8. A battery according to claim 5, wherein said solid electrolyte is a lithium ionically-conductive inorganic solid material.

9. A battery according to claim 8, wherein said lithium ionically-conductive inorganic solid material is lithium lanthanum perovskite.

10. A battery according to claim 5, wherein said electrolyte film comprises a mixture of an organic solid material and an inorganic solid material.

11. A battery according to claim 5, wherein said positive compound layer contains a powdered solid electrolyte.

12. A battery according to claim 5, wherein said negative compound layer contains a powdered solid electrolyte.

* * * * *